G. ESCHELLMANN.
PROCESS OF PURIFYING GASES CONTAINING SULFUR DIOXID.
APPLICATION FILED MAY 8, 1907.
900,500. Patented Oct. 6, 1908.
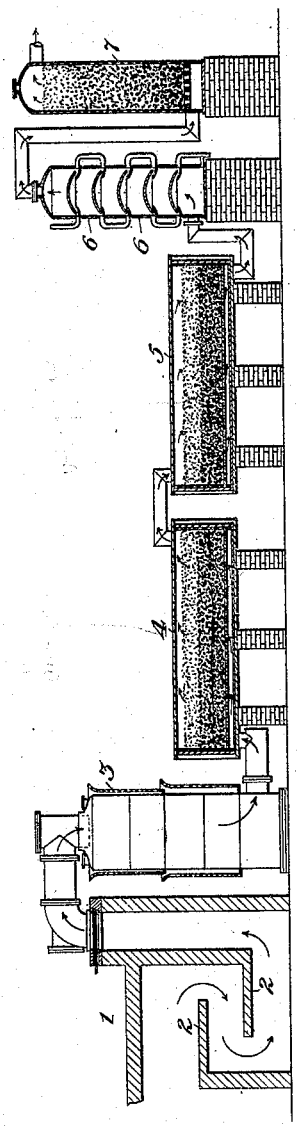

UNITED STATES PATENT OFFICE.

GEORG ESCHELLMANN, OF ST. PETERSBURG, RUSSIA.

PROCESS OF PURIFYING GASES CONTAINING SULFUR DIOXID.

No. 900,500.      Specification of Letters Patent.      Patented Oct. 6, 1908.

Application filed May 8, 1907. Serial No. 372,501.

*To all whom it may concern:*

Be it known that I, GEORG ESCHELLMANN, a subject of the King of Great Britain, residing at St. Petersburg, Russian Empire, have invented certain new and useful Improvements in Processes of Purifying Gases Containing Sulfur Dioxid, of which the following is a specification.

In the practice of manufacturing anhydrous sulfuric acid by the contact process from sulfur dioxid derived from pyrite, the gas must as is well known be subjected to a thorough purification for the purpose of protecting the apparatus and more particularly the contact mass. Heretofore efforts to purify these gases have been directed mainly to effecting the complete separation of the vapors of hydrated sulfuric acid, and the finely distributed impurities containing iron, manganese, copper, nickel, arsenic, antimony, phosphorus, mercury, lead, zinc, bismuth, calcium, selenium, fluorin, etc. Chlorin commonly occurs as an injurious constituent of such gases, but its separation therefrom is an unsolved task.

According to this invention chlorin is completely separated from the gas current by subjecting the same, after the vapors of hydrated sulfuric acid have been carefully removed, to the action of hydroxids of the alkali or alkaline earth metals. Under these conditions bisulfites are formed, and the chlorin is removed through their agency.

It has been heretofore proposed to treat the impure hot sulfur dioxid with steam for the purpose of precipitating vapors of sulfuric acid, and after cooling to wash the gas with water for the purpose of removing the remaining sulfuric acid vapors, the water used for this purpose having been mixed with sodium sulfite or similar compounds. It is evident however that such method is ineffective for the removal of chlorin, inasmuch as the sulfite or bisulfite of sodium is immediately transformed into sulfate by the sulfuric acid. It follows that the gases passing to the contact apparatus contain chlorin, which not only injures the contact mass but appears in the sulfuric acid produced; moreover a considerable quantity of sulfuric acid which always collects in the washing apparatus is contaminated by the sulfate formed therein, and its value is thereby impaired. It is evident moreover that chlorin could only be removed by this process by adding to the water a purifying agent or compound in such large proportion as would be required to combine both with the sulfuric acid and with the chlorin contained in the gases.

The present invention offers the advantage that a relatively small quantity of washing agent is required, and furthermore that the sulfuric acid contained in the gases, being removed before the washing of the gases by means of the hydroxids, is obtained directly in merchantable form.

According to the earlier process above mentioned the sulfuric acid is obtained as gypsum in case calcium hydroxid is employed for the purification; this compound is not only practically without value but owing to its slimy character is liable to obstruct the washers. If an alkali hydroxid is used a mixture of sulfate and chlorid is obtained in solution, and the sulfate can be recovered only after an expensive concentration and separation.

According to the present process the consumption of the hydroxid of the alkali or alkaline earth metal is limited to the quantity required for the absorption of the chlorin contained in the gases and of any hydrochloric acid formed therefrom. The chlorid formed is readily soluble even in case calcium hydroxid is employed as a washing agent, and is not mixed with sulfate derived from the sulfuric acid from the burner gases. The gases after treatment are free from the impurities which are usually separated and are also entirely free from chlorin.

For a full understanding of the invention reference is made to the accompanying drawing, showing a preferred form of apparatus in vertical longitudinal section.

Referring to the drawing, the gases pass from the burner to a dust chamber 1, provided with shelves 2, 2 upon which the coarser dust is deposited, the thorough mixing of the gases in their passage over the shelves serving at the same time to bring about the complete combustion of the sulfur contained therein. The gases pass thence through a cooler 3, wherein they are cooled by contact with water-cooled surfaces, and further portions of the dust are retained in the form of an easily removable slime; in this cooler a large proportion of the hydrated sulfuric acid vapors is condensed to sulfuric acid of about 52° Baumé; this acid in practice is permitted to flow from the cooler in a continuous stream.

The fine residual dust, as well as the residual sulfuric acid vapors, are then removed by conducting the gas from below through a coke filter 4, hereinafter referred to as the coarse filter; this filter is in practice constructed of two or more layers consisting of grains or fragments differing in size, the fragments being reduced in size in the direction of the gas current, that is to say from below upward; the upper layer usually comprises grains approximately 10 millimeters in diameter. In this coarse filter a large proportion of the remaining vapors of sulfuric acid are condensed to sulfuric acid of about 40° Baumé, which is permitted to flow off. The filter also retains any slime which may have been carried with the gas, as well as further portions of the dust.

The coarse filter 4 is preferably in practice so constructed that it can be freed from dust by flushing with water from below, and means are also provided for moistening the coke bed with water from either side in order to effect the washing of the gases. For this purpose there are preferably provided at the bottom of the filter uniformly distributed channels made of brick on which the coke mass rests. Each of these channels can be flushed by itself, thus permitting uniform and thorough washing without the necessity of removing the coke mass. In practice two similar filters are provided and are so connected that either may be operated independently, the gas being diverted to one of the filters whenever it is necessary to clean the other.

From the coarse filter the gases enter the fine filter 5, of which also two interchangeable units are provided. This fine filter contains a bed of coke composed of grains of approximately one millimeter in diameter, and serves to eliminate the very finest dust and vapor particles, in so far as they may have traversed the coarse filter; the fine filter bed may rest upon a bed of coarser particles as shown. In practice the gas enters the fine filter from above, so that the dust particles are deposited in the upper portions of the coke bed. The cleaning of the fine filter is not affected by flushing, which is found in practice to entail the stoppage of the filter bed by slime, but by replacing the topmost coke layer as far as it is found to be permeated with dust, by a fresh layer, whereupon the filter is at once ready for use. Practical experience has shown that it is necessary to effect this cleansing process only about once a year, and that fine filters treated in this manner can be used for years before it becomes necessary to refill them. Coke filtration as above described is found to be perfectly satisfactory for the continuous and thorough purification of large quantities of pyrite gases.

The gases leaving the filter 5 are now conducted through a series of washing chambers 6, 6, containing a dilute aqueous solution of an alkali hydroxid, or milk of lime or other alkaline earth hydroxid. In these chambers the corresponding alkali or alkaline earth sulfites or bisulfites are formed, and these enter at once into reaction with the chlorin contained in the gases, the chlorin combining with the base of the sulfite. The gas escaping from the washing chamber 6 is found to be entirely free from chlorin, and after drying in the usual manner, as in the drying tower 7, is led to the contact apparatus.

In practice it is found preferable to use for the absorption of chlorin an alkaline earth hydroxid in solution or suspension and preferably milk of lime, for the reason that any traces of sulfuric acid passing through the filter are thereby instantly removed by combining to form insoluble sulfates. The result of the process is to provide a gas which is absolutely pure, and to effect a great increase in the life of the contact mass.

I claim:

1. The process of purifying burner gases which consists in separating dust therefrom, cooling the gases and condensing sulfuric acid by contact with cooled surfaces, removing residual dust and sulfuric acid vapors by filtration, and thereafter subjecting the gases to a solution of metallic hydroxid to absorb chlorin.

2. The process of purifying burner gases which consists in separating dust therefrom, cooling the gases and condensing sulfuric acid by contact with cooled surfaces, removing residual dust and sulfuric acid vapors by filtration, and thereafter subjecting the gases to milk of lime to absorb chlorin and precipitate residual impurities.

In testimony whereof, I affix my signature in presence of two witnesses.

GEORG ESCHELLMANN.

Witnesses:
  H. A. LOVIAGUINE,
  AUG MIGHIS.